Figure 1:
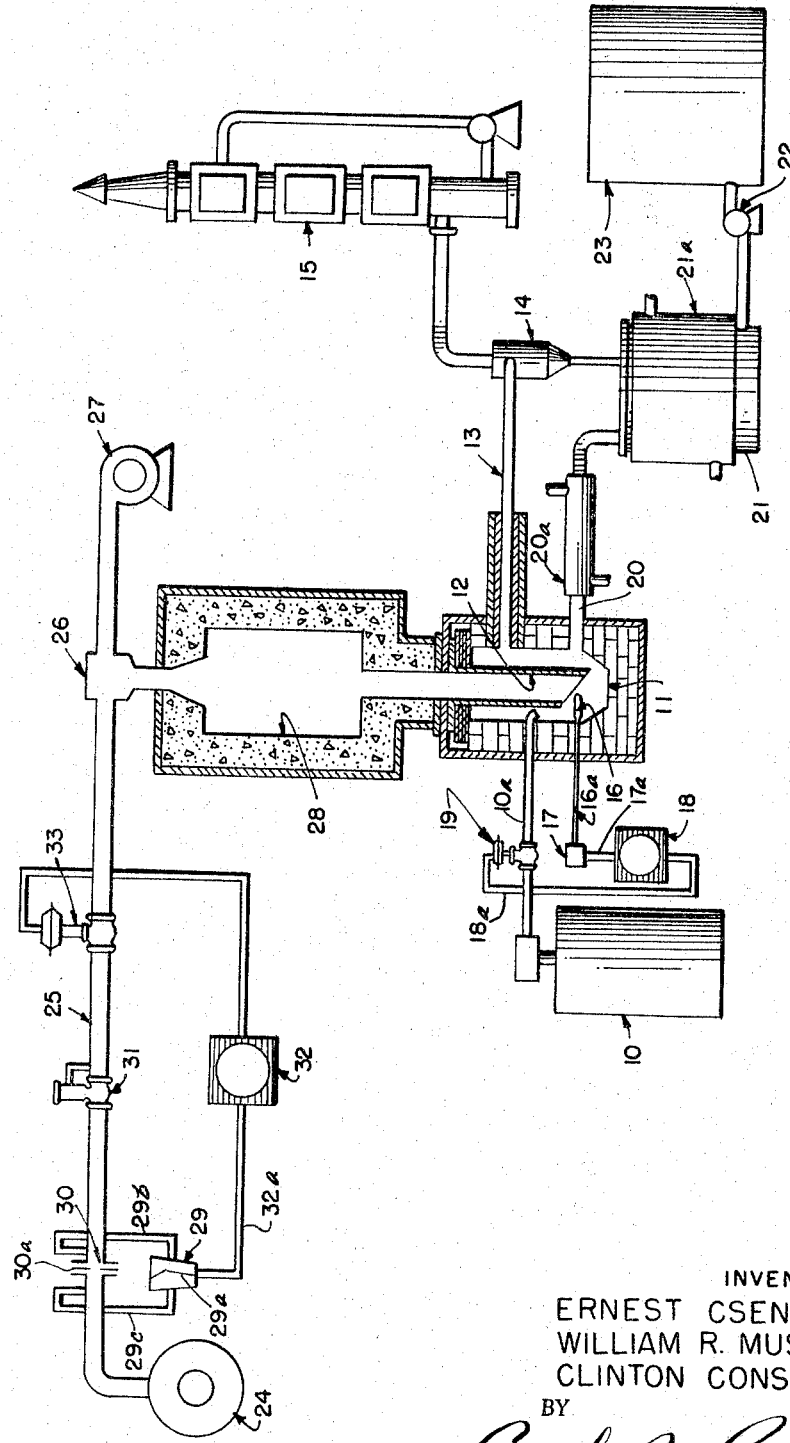

April 25, 1967

E. CSENDES ETAL 3,316,061

WET PROCESS ULTRAPHOSPHORIC ACID

Filed March 14, 1963

3 Sheets-Sheet 1

INVENTORS:
ERNEST CSENDES
WILLIAM R. MUSTIAN, Jr.
CLINTON CONSTANT

BY *Carl C. Batz*

ATT'Y

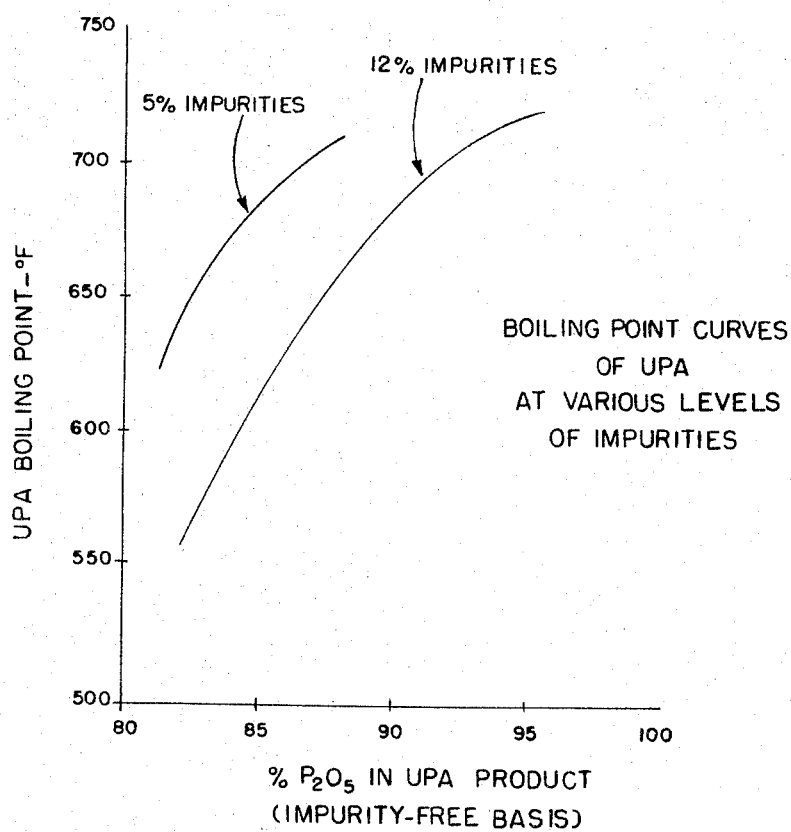

United States Patent Office 3,316,061
Patented Apr. 25, 1967

3,316,061
WET PROCESS ULTRAPHOSPHORIC ACID
Ernest Csendes, Atlanta, Ga., and William R. Mustian, Jr., Lakeland, and Clinton Constant, Bartow, Fla., assignors, by mesne assignments, to Armour Agricultural Chemical Company, a corporation of Delaware
Filed Mar. 14, 1963, Ser. No. 265,201
7 Claims. (Cl. 23—165)

This invention relates to wet process ultraphosphoric acid having a phosphorus content of at least 83 weight percent (expressed as $P_2O_5$ equivalent on an imprity-free basis), and more particularly to such high phosphorus value acid which is liquid at ambient or ordinary temperatures.

For many years, the phosphate industry has recognized the advantages arising out of an increased $P_2O_5$ content of wet process phosphoric acid, and has sought to produce liquid acid products having a high $P_2O_5$ content. However, the prior work in this field has indicated that such acid product having a $P_2O_5$ content higher than about 80 weight percent would not be realistic or desirable because as the concentration approaches 80 weight percent, the product becomes highly viscous and becomes solid at room temperature. Further, it has been indicated that as the acid is concentrated by heating beyond the previously accepted concentrations, a substantial amount of metaphosphoric acid is produced, and this has the adverse effect of forming insoluble salts.

We have produced a wet process phosphoric acid having a salt content of 1–15% and an equivalent $P_2O_5$ content of 83 to 98 and above weight percent, and find that such acid composition has new and surprising properties. Such an acid composition is referred to herein as ultraphosphoric acid.

We have discovered that as the dehydration of the wet process acid proceeds beyond the previously accepted concentrations, there is a point at which viscosity of the product begins to decrease, and by continuing the dehydration beyond this point, it is possible to produce a liquid product. This product containing the metal salts therein as sequestered solids may be pumped into and out of tank cars at ambient temperatures. Another property of the product is that its corrosive effect on mold steel is less than wet process phosphoric acids heretofore produced. Still another property of the product is its greater sequestering value with respect to impurities. Ultraphosphoric acid when converted to a liquid fertilizer containing nitrogen, such as a 10–34–0, demonstrates a much higher sequestering value than furnace superphosphoric acid products.

A primary object therefore of the present invention is to provide new products having unusual properties as indicated above. A further object is to provide a process for converting a wet process phosphoric acid material into an ultraphosphoric acid product. A still further object is to provide novel means and process steps for improving the manufacture of phosphoric acid. Other specific objects and advantages will appear as the specification proceeds.

The invention is shown, in an illustrative embodiment, by the accompanying drawings, in which—

Figure 2:
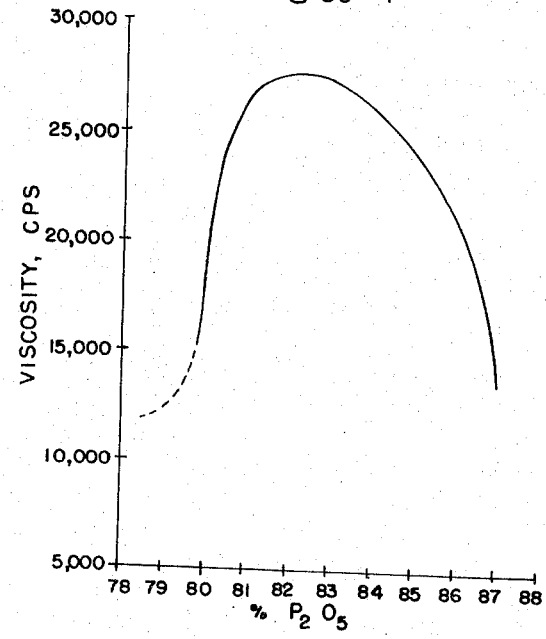
Figure 3:
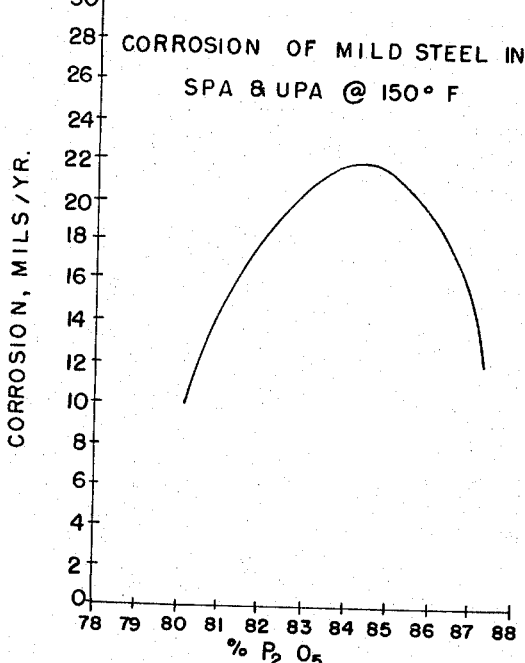

FIG. 1 is a side view in elevation, and partly in section, of apparatus illustrating our invention; FIG. 2, a graph setting forth a viscosity curve; FIG. 3, a graph showing a corrosion curve; and FIG. 4, a graph showing boiling points of ultraphosphoric acids.

In one embodiment of our invention, wet process phosphoric acid is supplied to an evaporator to provide a pool therein, and the acid pool is maintained at a desired temperature by submerged gas heating, the gaseous products of combustion being directed into the pool and the volume of such combustion gas being maintained at a substantially constant level. The temperature of the pool of acid is maintained at a selected temperature, plus or minus a few degrees, within a range of about 630° F. to 750° F. The pool temperature is maintained preferably by regulating the feed rate of fresh acid into the pool. By providing a system in which the acids are retained in the evaporator a relatively short time, we find we can produce a uniform ultraphosphoric acid in which the undesirable meta form is held to a low level and which contains 83 to 98 and higher weight percent phosphorus, expressed as $P_2O_5$ equivalent on an impurity-free basis.

The acid starting material which is fed to the pool may be any wet process phosphoric acid. We can use the ordinary wet process phosphoric acid of commerce. Such acid may have a metal salt content of from 1–15%. The usual range of such metal impurities is between 5 and 10%. For supplying heat to the process we may provide a stream of hot gases resulting from combustion of air and fuel such as propane or other gaseous or liquid fuels. These gases may have a temperature of the order of 1500 to 1900° F. It is a feature of our invention that the volume of such gases be fed at a constant rate irrespective of back pressures created in the evaporator, and such constant volume is effectively provided by a combination of instruments or devices which are shown in greater detail in our copending application entitled "Concentration of Phosphoric Acids" filed Mar. 14, 1963, and bearing Ser. No. 265,200.

As a specific illustration and referring more particularly to FIG. 1 of the drawings, phosphoric acid, which may be of the range 27 to 64 weight percent phosphorus calculated as $P_2O_5$ equivalent, is pumped from feed tank 10 through pipe 10a to evaporator 11, forming a pool in the frusto-conical portion of the evaporator 11.

The hot combustion gases are directed through the dip pipe 12 to the lower portion of the reaction chamber where they are discharged from the lower inclined opening of the dip pipe. The gases discharged from the dip pipe proceed toward the bottom and an inclined wall of the frusto-conical portion. Here the swiftly moving stream of hot gases engages the liquid acids in the pool at the bottom of the evaporator and while in intimate mixture with the acids carry them upwards in a state of turbulence within the reaction chamber. The moisture-laden gases which disengage from the acid in the space above the evaporator bottom are removed by duct 13 to separator 14. Entrained acid droplets removed in the separator 14 are returned to receiver 21, and the gases continue on to the floating-bed scrubber 15, where condensable and water-soluble pollutants are removed.

The temperature of the liquid acids within the reaction chamber is maintained at a substantially constant value by a control circuit. The filled bulb 16 communicates with the pneumatic transmitter 17 through conduit 16a, and the pressure transmitter 17 communicates similarly through conduit 17a with the recorder-controller 18 which is pre-set to the desired temperature and which pneumatically operates through conduit 18a the diaphragm control valve 19 in the feed acid line 10a. In operation, the filled bulb 16 senses the acid temperature and records the same by means of transmitter 17 with recorder-controller 18 which is pre-set to the desired temperature, the signal from the bulb to the transmitter being by pressure through the gas-filled conduit 16a. The recorder-controller in operation adjusts the diaphragm control valve 19 so as to increase or decrease the amount of feed as required to maintain the set or predetermined temperature. The effect of this system is to decrease the feed rate with increasing water content of the feed acid, and to increase the feed rate when the water content of the acid decreases.

The dehydrated acid product is removed from the evaporator 11 through liquid overflow line 20, which is cooled by a water jacket 20a, to the receiving tank 21 which is provided with a cooling jacket 21a. From the receiver 21, the product is passed by pump 22 to product tank 23.

A fuel gas, such as propane, is passed from fuel tank 24 through conduit 25 to the vortex burner 26 where it is mixed with air (preferably an excess of air) from blower 26. Combustion takes place within the chamber 28, and the combustion gases are delivered through the dip pipe 12, as heretofore described. Overflow pipe 20 is located at a point on the evaporator, which is generally in line with the top of the liquid pool and which is opposite the inclined wall toward which the hot gases are directed.

A substantially constant rate of fuel gas input is maintained, irrespective of fluctuations in back pressure, by the following combination of control elements. A differential pressure meter 29 has a diaphragm 29a. Pressure conduits 29b and 29c lead to tapped openings communicating with the interior of the conduit 25 on opposite sides of a flow element 30 which is equipped with a disk or plate 30a providing a sharp-edged flow orifice. The conduits 29b and 29c are connected across the diaphragm 29a of the differential pressure meter 29 which measures the flow incident through flow element 30. The gas flows through the element 30 and is reduced in pressure by the balanced regulator 31, for example, to about 30" water column. The differential pressure result is transmitted by element 29 to the recorder-controller 32 through pneumatic tube 32a. The controller 32 is provided with a control member which is pre-set to a selected pressure and therefore it responds to changes in flow of the fuel gas through flow element 30. For example, if there is an increased back pressure in the evaporator dip pipe, such increase is sensed by the conduit 29b at one side of the orifice plate 30a, and such increase of pressure is transmitted through the transmitter 29 to the controller 32, which pressure, being above that to which the recorder 32 is set, causes the recorder to move the diaphragm control valve 33 toward open position. Similarly, with a decrease in back pressure, the recorder-controller 32 moves the diaphragm controlled valve 33 a proportional distance toward closed position.

In conducting our process for the production of our special high phosphorus acids, it is important that certain features of the reaction be taken into account. Referring particularly to FIG. 1, the hot gases proceeding into the reaction chamber through tube 12 move quickly to near the bottom of the frusto-conical lower portion of the reaction chamber, there entering the liquid pool. From the bottom of this chamber, the very hot gases moving together with portions of the liquid pool are passed upwardly guided by the frusto-conical surface of the lower portion of the chamber and move about within the chamber in intimate contact with the liquid acids, thus to provide effective heat transfer.

We believe that the reaction of dehydration takes place especially fast where small droplets or portions of liquid are in direct contact with the hot gas, and that upon reaction, the product so formed may then come into contact with larger bodies of liquid so as to be quenched and brought back to the temperature of the liquid body. As the reaction takes place and the reaction products reach the outlet 20, these products pass off from the reaction chamber and are quickly cooled. The reaction is rapid and violent, and we believe that if the reaction products are not quickly removed after being formed, unwanted reactions, such as the formation of metaphosphoric acids, will take place.

To provide for quick removal of the dehydrated acids from the reaction zone, the rate of introduction of feed acids should be related to the volume of the acids within the reaction zone so that the acids will be passed through the reaction chamber in a certain minimum time. We find it important to use an acid feed rate in volume per minute which is at least $\frac{1}{12}$ of the volume of the liquid within the reaction chamber and preferably at least $\frac{1}{3}$ of the liquid volume within the reaction chamber (the volume in each case should, of course, be counted in the same units). To provide a range, we recommend that the ratio between the volume per minute of feed and volume of liquid within the reaction zone be from $\frac{1}{2}$ to $\frac{1}{12}$. From the foregoing it will be seen that with a contemplated feed rate of 4 gallons of wet process phosphoric acid per minute the reaction chamber should be designed so as to contain from 8 to 48 gallons of acids which would provide an average retention time of the acids within the reaction chamber of 2 to 12 minutes.

In the structure shown in FIG. 1, a volume of ten gallons is provided by the frusto-conical bottom portion of the evaporator in which the cone is 10 inches high, with a diameter of 23 inches at the top of the cone with the liquid draw-off pipe 20 at a point 10 inches above the flow bottom of the evaporator.

The temperature attained by the liquid acids through contact with the hot gaseous products of combustion should preferably be the boiling point of the acid in the desired product composition which has the lowest boiling point. For example, if it is desired to produce a composition having a concentration of 85 weight percent phosphorus calculated as $P_2O_5$ equivalent on an impurity-free basis from a commercial wet process phosphoric acid containing 12% of metal salts, the feed acid should be brought to a temperature of 670° F. which is the boiling temperature of such composition.

While the preferred range of pool temperatures is from 630 to 750° F., higher temperatures up to 1000° C. may be employed where a liquid product is not required or where additives are used to keep the acid product liquid at ambient temperatures.

Boiling points of some of our high phosphorus compositions are set forth in FIG. 4 in which the curve $a$ gives boiling points of compositions produced from wet process acids containing 5% metal salts at varying concentrations and curve $b$ gives boiling points of compositions produced from wet process acids containing 12% metal salts at various concentrations.

After our present disclosure and a study of the relationship of the boiling points of the compositions of high phosphorus content having different percentages of impurities therein, it will be apparent that instead of being a handicap to the production of the high phosphorus compositions the so-called impurities including the metal salts actually facilitate the process by substantially lowering the boiling points of the materials being dehydrated and enable the production of compositions containing phosphorus to a higher degree at temperatures substantially lower than would be required without them.

The hot gases are introduced into the reaction chamber at such a rate that the heat given off by them to the liquid acid is sufficient to raise the acids within the reaction chamber to the temperature which is selected in accordance with the principles outlined above. This rate is maintained by the automatic devices already described. By controlling the flow of fuel gas at a uniform rate, the heat input is thus maintained at a uniform rate and therefore the acids are heated uniformly even though there be temporary clogging or stoppage of the inlet pipe or of the discharge opening of the pipe. The design of this pipe should be such as to provide an adequate internal cross section so that at the desired rate of gas flow the velocity of the gas issuing from this pipe will not be so great as to blow the liquid acids from the entire bottom portion of the chamber and thus destroy the liquid pool.

In the design illustrated in FIG. 1 the medium pool cross-sectional area (226.9 sq. in.) bears with the cross-sectional area of the dip pipe (28.3 sq. in.) the ratio of 8-to-1. We recommend that the median pool cross-sectional area should bear a ratio of the cross-sectional area of the dip pipe of at least 5.5-to-1. We find that if ratios are maintained within the range specified above, combustion gas velocity rates are possible which are sufficiently high for the necessary heat transfer yet are low enough to preclude the blowing dry of the liquid pool.

Another feature of the embodiment of our invention illustrated in FIG. 1 is that the outlet 20 for withdrawing product from the reaction chamber is opposite the inclined surface toward which the inclined opening of the dip pipe is directed so that the greater turbulence of liquid and gases is on one side of the chamber and there is less likelihood that such turbulence will affect the pool near the point where product is withdrawn.

From the above discussion on the relationship between temperatures of the acids, the rate of introduction of fuel and rate of introduction of feed acids it will be apparent that the system may be designed for larger capacity by proportionately increasing the size of the reaction chamber, the rate of introduction of feed acids, and the rate of introduction of fuel gas in the hot gas mixture, desirably also with increase in the internal size of the dip pipe to avoid increasing velocity to the point where the pool might be blown out.

Other properties of the concentrated product are illustrated by FIGS. 2 and 3. FIG. 2 shows the viscosity curve for wet process super-phosphoric acid (SPA) and ultraphosphoric acid (UPA) at about 80° F., the viscosity being in centipoises and the phosphorous content in weight percent expressed as $P_2O_5$ on an impurity-free basis, these acid compositions being prepared from the process acid having impurities including metal salts in the amount of 9%. For compositions prepared from acids having a lower content of impurities the curve of FIG. 2 is shifted slightly to the left and for compositions prepared from acids having a higher content of impurities this curve would be shifted somewhat to the right. For an acid containing about 3–6% salts, the drop becomes substantial at about 83 weight percent. As the salt content is increased to 15%, the drop occurs substantially at about 94 percent expressed as $P_2O_5$ on an impurity-free basis.

FIG. 3 shows a corrosion curve for compositions having $P_2O_5$ values similar to those described in FIG. 2, the corrosion being expressed in mils per year and at a temperature of 150° F. If such compositions are prepared from wet process acids having less than 9% impurities, the curves of FIG. 3 would be shifted somewhat to the left and if prepared from wet process acids having more than 9% impurities, would be shifted somewhat to the right. It will be noted that the curves of both FIGS. 2 and 3 have decreased substantially at concentrations of 86% and higher.

The high $P_2O_5$ values of the ultraphosphoric acid product may possibly be accounted for by the presence of known or unknown high phosphorus content compounds having values greater than 100 weight percent expressed as $P_2O_5$ on an impurity-free basis. It is likely that in our process, we are dealing with a quench reaction wherein $P_2O_3$, $P_4O$, or other lower oxides of phosphorus are formed in the contact zone of hot gas and reactor liquid. In turn, these species are chemically reactive at the temperature and may modify any metaphosphoric acid, tri- or tetra-poly-phosphoric acid, or other forms to yield the very high analysis unknown ultraphosphoric acids of greater sequestering power. It is easy to see that the presence of ultraphosphoric acid containing condensed molecules derived from $P_4O$, or other like species with a high analysis in excess of 125 percent $P_2O_5$ equivalent, would thus greatly increase the $P_2O_5$ content of mixtures in which they are present.

Specific detailed examples illustrative of the process may be set out as follows:

*Example I*

The wet process phosphoric acid feed was fed to the evaporator as shown in FIG. 1. This feed was at the following composition:

| | Percent |
|---|---|
| $P_2O_5$ | 54.6 |
| F | 1.0 |
| $SO_3$ | 3.0 |
| $Al_2O_3$ | 1.5 |
| $Fe_2O_3$ | 2.0 |
| Solids | 2.4 |

Hot gases produced in the combustion chamber (using propane and air), were admitted to the evaporator at the temperature of 1750° F., and directed under the surface of of the acid. The acid pool was maintained at a temperature 690° F., plus or minus 2° F. Feed acid of the above composition was admitted at a rate of 1.3 gal. per minute. The average retention time in the evaporator at this feed rate was about 9 minutes. The product withdrawal rate was about 0.9 gal. per minute. The temperature of the effluent product acid was about 640° F., and was collected in the product receiver, the temperature of which was maintained at 450° F. The moisture-laden gases, which disengaged in the space above the acid pool, were at about 765° F., and were removed through a duct to a cyclone separator. About 1% of the product acid was recovered in the cyclone, and returned to the product receiver. After removal of the entrained acid droplets, the gases continued to a floating-bed scrubber where condensable and water-soluble pollutants were removed. The effluent gases issued from the stock of the floating-bed scrubber at a nil content of fluorine and $SO_2$, and about 2# per day of $SO_3$. The product had the following composition:

| | Percent |
|---|---|
| $P_2O_5$ | 88.0 |
| F | 0.2 |
| $SO_3$ | 2.0 |
| $Al_2O_3$ | 1.8 |
| $Fe_2O_3$ | 1.9 |
| CaO | 0.3 |
| MgO | 2.0 |

Conversion of ortho phosphate to poly- and ultraphosphates was 72%. The product had a citrate insolubility of 8.0% and a water insolubility of 8.0%. The product was red brown in color, had a specific gravity (g./cc.) of 2.12, and a viscosity of 13,000 cps. at 80° F.

The control means for maintaining the temperature within a few degrees of the selected temperature was as follows:

Propane gas was admitted through a conduit at about 30 p.s.i.g. The combination of control elements was as shown in FIG. 1 of the drawing. The gas flowed through the orifice of plate 30a and was reduced in pressure by the balanced regulator 31 to 30″ water column. The pressure taps around the flow plate 30a were connected across the diaphragm 29a of the differential pressure meter 29 (Foxboro Type 15A d./p. Cell Transmitter) for the purpose of measuring the flow incident through the element 30. The pressure differential result was communicated through the pneumatic pipe 32a to the recorder-controller 32, which was a series "500" proportional air-operated free-vane controller, Bristol Company instrument bulletin A1420. The control of the recorder-controller was set to respond to changes in flow of the propane gas through flow element 30. As the flow of gas varies, due to changing back pressure in the evaporator, a pneumatic signal is transmitted from controller 32 to the diaphragm control valve 33, which opens in response to an increase in back pressure, and which closes with a decrease in back pressure. This control provided a substantially constant volume of fuel gas throughout the operation. Air was supplied by blower 23 in excess of the amount needed for combustion. The combustion occurred in chamber 28, and gaseous products of combustion were discharged through pipe 12 into the pool of acid below the surface of the pool.

The temperature of the combustion gases discharged into the pool of acid was about 1750° F. With a constant heat input, it was necessary to control the input of feed acid so as to maintain a constant acid pool temperature or its corollary product composition. A filled bulb 16 in the acid pool transmitted the temperature result by pressure through a gas-filled conduit upon the pneumatic transmitter 18 which transmitted the result to recorder-controller 18. The pressure transmitter was Taylor Instrument Company Model 339R, and the recorder-transmitter was Taylor Instrument Company Fulscope Controller, the latter instrument being set for a predetermined acid pool temperature and it operated the diaphragm control valve 19 to decrease the feed rate when the feed acid had a high water content and to increase the feed rate proportionally as the water content of the acid decreased. A uniform pool temperature was obtained, plus or minus 2° F.

*Example II*

Feed material of the composition set out in Example I was fed into the evaporator as described in Example I. The combustion gases as described in Example I were introduced into the pool of acid, and had a temperature of 1750° F. The acid pool temperature was controlled at 585° F., plus or minus 2° F. The feed rate was 1.4 gal. per minute corresponding to retention time of 8.5 minutes. Product withdrawal rate was about 1.0 gal. per minute. Product acid was withdrawn from the evaporator at a temperature of 535° F.

The product receiver was maintained as in Example I at the temperature of 450° F. The saturated combustion gases disengaged from the acid pool at about 660° F., and were removed as described in Example I. The product had the following composition:

| | Percent |
|---|---|
| $P_2O_5$ | 83.0 |
| F | 0.4 |
| $SO_3$ | 3.0 |
| $Al_2O_3$ | 2.0 |
| $Fe_2O_3$ | 2.0 |
| CaO | 0.3 |
| MgO | 2.0 |

Conversion of ortho phosphate to poly-and ultraphosphates was 58%.

The product was black in color and had a citrate insolubility of 0.5%. The viscosity was 12,000 cps. at 80° F., and the specific gravity 2.0. The control means for maintaining the temperature within a few degrees of the selected temperature was as described in Example I.

*Example III*

The process was carried out the same as Example I except that the acid pool temperature was maintained at 710° F., plus or minus 2° F. The effluent gas temperature was 785° F. Product acid withdrawal was at the temperature of 660° F. The product composition was as follows:

| | Percent |
|---|---|
| $P_2O_5$ | 93.0 |
| F | 0.1 |
| $SO_3$ | 2.5 |
| $Al_2O_3$ | 2.0 |
| $Fe_2O_3$ | 2.0 |
| CaO | 0.3 |
| MgO | 2.0 |

Conversion of ortho phosphate to poly-and ultraphosphates was 90%.

The color of the product was black, and it had a citrate insolubility of 4.0% and a water insolubility of 5.0%. The specific gravity was 2.08, and viscosity 30,000 cps. at 80° F. The average retention time of the acid in the evaporator pool was 12 minutes.

As illustrated by the foregoing examples, the temperature of the acid pool maintained during the quench reaction type of operation and a controlled low average retention time of the acid in the evaporator determine the $P_2O_5$ value of the final concentrated product.

*Example IV*

A series of runs, designated as A, B, C, and D in Table I, were carried out as described in Example I with the results indicated in the table. The feed rates are indicated in gallons per minute.

TABLE I

| | A | B | C | D |
|---|---|---|---|---|
| Percent $P_2O_5$ | 84.0 | 83.0 | 85.0 | 85.0 |
| Percent F | 0.2 | 0.2 | 0.1 | 0.1 |
| Percent $SO_3$ | 2.0 | 4.0 | 4.0 | 3.0 |
| Percent $Al_2O_3$ | 1.0 | 1.1 | 1.2 | 1.2 |
| Percent $Fe_2O_3$ | 1.5 | 1.4 | 1.7 | 1.5 |
| Percent CaO | 0.1 | 0.1 | 0.1 | 0.1 |
| Percent MgO | 2.0 | 1.1 | 2.4 | 2.0 |
| Percent water insolubility | 5.0 | 3.7 | 9.0 | 12.0 |
| Specific gravity | 2.21 | 2.1 | 2.2 | 2.2 |
| Combustion gas (° F.) | 1,750 | 1,750 | 1,750 | 1,750 |
| Acid pool temp. (° F.) | 670 | 660 | 670 | 680 |
| Acid pool volume (gal.) | 10 | 10 | 10 | 10 |
| Acid feed rate (g.p.m.) | 1.7 | 1.6 | 1.1 | 1.0 |
| Retention time (min.) | 5.8 | 6.2 | 9.0 | 10.0 |
| Product rate (g.p.m.) | 1.1 | 1.1 | 0.7 | 0.7 |
| Prod. receiver temp. (° F.) | 450 | 450 | 450 | 450 |
| Effluent gas temp. (° F.) | 730 | 730 | 730 | 750 |
| Percent conversion to ultraphosphoric | 77.0 | 77.0 | 81.0 | 94.0 |

While in the foregoing specification we have set out specific embodiments of the invention in considerable detail for the purpose of illustrating the invention, it will be understood that such detail or details may be varied widely by those skilled in the art without departure from the spirit and scope of our invention.

We claim:

1. As a new composition of matter, liquid wet process ultraphosphoric acid containing 1–15% of metal salts, said acid having a phosphorus content of 83–98 weight percent expressed as $P_2O_5$ equivalent on an impurity-free basis and having at least 70% of the $P_2O_5$ thereof in the polyphosphate form.

2. As a new composition of matter, wet process ultraphosphoric acid containing 1–15% of metal salts and having a phosphorus content of 83–94 weight percent expressed as $P_2O_5$ equivalent on an impurity-free basis, said acid having at least 80% of its $P_2O_5$ in the polyphosphate form.

3. In a process for preparing ultraphosphoric acid, the steps of passing a stream of hot combustion gases into a reaction chamber and into contact with wet process phosphoric acid containing as impurities 1–15% of metal salts to heat said acid and evolved water vapor, removing the evolved water vapor, and continuing said heating until the said acid has a phosphorus content of 83–98 weight percent expressed as $P_2O_5$ equivalent on an impurity-free basis and until at least 70% of its $P_2O_5$ content is in the polyphosphate form.

4. The process of claim 3 in which said heating is continued until at least 80% of the $P_2O_5$ content of the product is in the polyphosphate form.

5. The process of claim 3 in which said hot gases are introduced into the wet process phosphoric acid at a constant volumetric rate.

6. The process of claim 5 in which feed acid is introduced at a rate for maintaining a constant liquid temperature.

7. The process of claim 5 in which the feed acid is introduced at a volumetric rate to maintain a constant temperature in the range of 630–750° F.

(References on following page)

References Cited by the Examiner

UNITED STATES PATENTS

| | | | |
|---|---|---|---|
| 2,522,475 | 9/1950 | Walker | 23—307 |
| 2,917,367 | 12/1959 | Hodges et al. | 23—165 |
| 2,962,357 | 11/1960 | Williams et al. | 23—165 |
| 3,104,947 | 9/1963 | Switzer et al. | 23—165 X |
| 3,192,013 | 6/1965 | Young | 23—165 |
| 3,193,350 | 7/1965 | Beltz et al. | 23—165 |

OTHER REFERENCES

Van Wazer: "Phosphorus and Its Compounds," volume 1, pages 708–716, 747–754, 770–775, Interscience Publishers, Inc., New York, 1958.

OSCAR R. VERTIZ, *Primary Examiner.*

O. F. CRUTCHFIELD, *Assistant Examiner.*